United States Patent
Rupe

(10) Patent No.: US 7,010,399 B2
(45) Date of Patent: Mar. 7, 2006

(54) METHODS AND APPARATUS FOR FUEL CONTROL USING INERTIAL MEASUREMENT DATA

(75) Inventor: Kurt A. Rupe, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 10/720,605

(22) Filed: Nov. 24, 2003

(65) Prior Publication Data

US 2005/0113984 A1     May 26, 2005

(51) Int. Cl.
*G06F 19/00* (2006.01)
(52) U.S. Cl. .................... 701/3; 701/123; 60/39.281
(58) Field of Classification Search ............... 701/3, 701/123; 60/39.281, 235–239
See application file for complete search history.

(56) References Cited

U.S. PATENT DOCUMENTS

| | | | |
|---|---|---|---|
| 3,748,897 A * | 7/1973 | Rabinowitz | .......... 73/118.1 |
| 4,077,204 A | 3/1978 | Itoh | |
| 4,142,364 A | 3/1979 | Wanger | |
| 4,344,141 A | 8/1982 | Yates | |
| 4,423,593 A * | 1/1984 | Zagranski et al. | .......... 60/791 |
| 5,107,674 A * | 4/1992 | Wibbelsman et al. | .......... 60/778 |
| 5,129,221 A * | 7/1992 | Walker et al. | .......... 60/778 |
| 6,126,111 A | 10/2000 | Burcham, Jr. et al. | |
| 6,568,189 B1 | 5/2003 | Blot-Carretero et al. | |
| 6,584,762 B1 | 7/2003 | Snow et al. | |
| 6,644,009 B1 | 11/2003 | Myers, Jr. | |

* cited by examiner

*Primary Examiner*—Gary Chin
(74) *Attorney, Agent, or Firm*—Black Lowe & Graham, PLLC

(57) ABSTRACT

Methods and apparatus for fuel control systems using inertial measurement data are disclosed. In one embodiment, a method for controlling a fuel flow includes comparing an acceleration condition of the aircraft with a predetermined threshold at which normal fuel fluid characteristics begin to become unpredictable, and comparing the acceleration condition with a time-based acceleration profile for a given flight profile. Next, the method determines whether the aircraft is about to enter a prolonged negative acceleration regime. The method further includes maintaining normal fuel control and, after a predetermined amount of time has passed, initiating an alternate fuel source to the engine.

31 Claims, 5 Drawing Sheets

METHODS AND APPARATUS FOR FUEL CONTROL USING INERTIAL MEASUREMENT DATA

FIELD OF THE INVENTION

The present invention relates to methods and apparatus for controlling fuel delivery to a propulsion system of an aircraft, and more specifically, to methods and apparatus for fuel control using inertial measurement data.

BACKGROUND OF THE INVENTION

During maneuvers and other types of flight conditions, an aircraft propulsion system typically requires varying rates of fuel flow. Fuel control systems have therefore been developed that provide varying fuel flow rates depending upon a variety of inputs, including, for example, those fuel control systems disclosed in U.S. Pat. No. 6,644,009 B2 issued to Myers, U.S. Pat. No. 6,584,762 B2 issued to Snow et al., U.S. Pat. No. 6,568,189 B2 issued to Blot-Carretero et al., and U.S. Pat. No. 4,344,141 issued to Yates.

One conventional fuel control system employs a sump to endure negative gravitational forces. During a long dive when the engine needs to remain powered throughout the end of the dive, the sump fuel volume can become relatively large. Sumps typically are unable to utilize the entire sump fuel volume, resulting in a substantial percentage of the sump fuel volume not being usable. To reduce the unusable portion of the sump fuel volume, alternate fuel storage systems, such as a fuel accumulator, may be employed. This may reduce the overall sump volume required, and therefore, the unusable portion of the sump fuel volume.

Although desirable results have been achieved using prior art fuel control systems, there is room for improvement. For example, the time to switch from the sump to the alternate fuel storage system (e.g. an accumulator) impacts the sizing of both the sump and the alternate system. In order to provide improved design of these components, a need exists for accurate methods and apparatus for determining the point of handover from the sump to the alternate system.

SUMMARY OF THE INVENTION

The present invention is directed to methods and apparatus for fuel control using inertial measurement data. Apparatus and methods in accordance with the present invention may advantageously provide improved determination of the point of handover from the sump to the accumulator, thereby permitting a fuel system designer to optimize volumetric space by trading off sump and accumulator volume to achieve the optimum arrangement.

In one embodiment, a method for controlling a fuel flow to an engine of an aircraft includes comparing an acceleration condition of the aircraft with a predetermined threshold at which normal fuel fluid characteristics begin to become unpredictable, and comparing the acceleration condition with a time-based acceleration profile for a given flight profile. Next, the method determines whether the aircraft is about to enter a prolonged negative acceleration regime. The method further includes maintaining normal fuel control and, after a predetermined amount of time has passed, initiating an alternate fuel source to the engine.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and apparatus for fuel control using inertial measurement data. Many specific details of certain embodiments of the invention are set forth in the following description and in FIGS. 1–5 to provide a thorough understanding of such embodiments. One skilled in the art, however, will understand that the present invention may have additional embodiments, or that the present invention may be practiced without several of the details described in the following description.

In brief, embodiments of methods and apparatus in accordance with the present invention may provide improved determination of the point of handover from the sump to the alternate fuel storage system (e.g. an accumulator). More specifically, embodiments of the present invention may utilize inertial measurement data in a fuel control system to provide the required fuel to an engine. In a particular embodiment, the fuel control system may be an open loop control system. Embodiments of the present invention may thereby allow the sizes of the fuel sump and the alternate system to be optimized.

Figure 1:
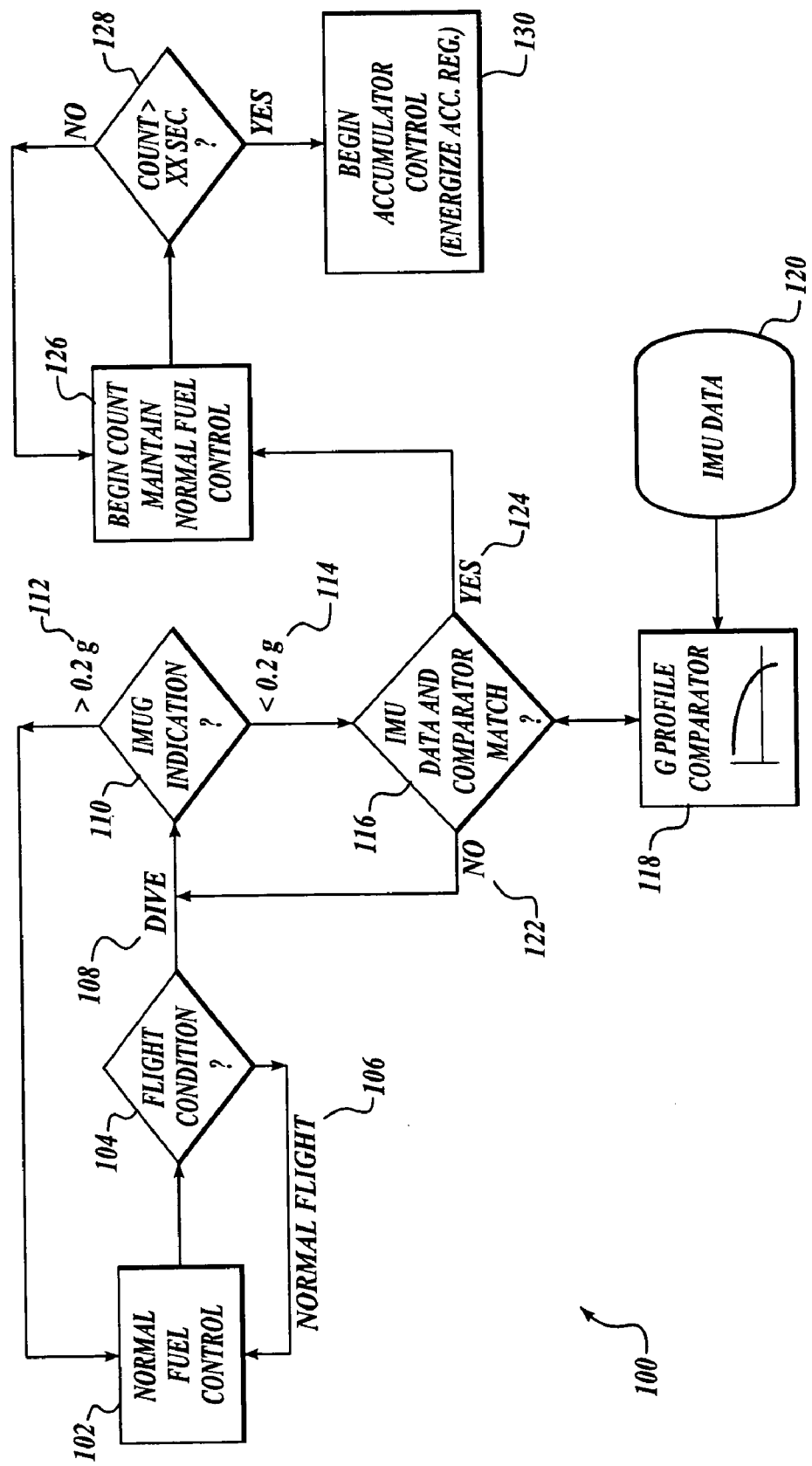
FIG. 1 is a flow diagram of a method of controlling fuel flow to an engine in accordance with an embodiment of the present invention.

FIG. 1 is a flow diagram of a method of controlling fuel flow 100 to an engine in accordance with an embodiment of the present invention. As shown in FIG. 1, the method 100 includes controlling fuel flow in a normal manner at a block 102. At a block 104, a determination is made regarding a flight condition of the aircraft. If a normal flight condition 106 exists, then the method 100 returns to the block 102 and continues controlling fuel flow in the normal manner and continues checking the flight condition at the block 104.

If a dive condition 108 is determined at the block 104, then the method 100 uses an inertial measurement unit (IMU) to determine an acceleration condition at a block 110. If the acceleration condition (normally approximately 1 gravitational constant g) is greater than (or equal to) a condition 112 at which normal fuel fluid characteristics begin to become unpredictable, then the method returns to the block 102 and continues to perform normal fuel control. As shown in FIG. 1, in one particular embodiment, for example, the condition at which normal fuel fluid characteristics begin to become unpredictable at about a 0.2 g condition.

On the other hand, if the acceleration condition is less than (or equal to) the condition at which normal fuel fluid characteristics begin to become unpredictable (e.g. 0.2 g) 114, then at a block 116, the method 100 performs a comparison of the IMU data with a time-based g profile 118 for the given flight profile to determine if this is a momentary g excursion or if the system is actually about to enter a prolonged negative g regime. In one particular embodiment, the time-based g profile 118 may be extracted from a pre-existing database of IMU data 120 for a variety of mission profiles.

As further shown in FIG. 1, if the determination of block 116 indicates that the acceleration condition is not entering a prolonged negative g regime condition 122, then the method 100 returns to block 110 and continues to perform the IMU acceleration determination. If, however, the determination of block 116 indicates that the acceleration condition has entered, or is about to enter, the prolonged negative g regime condition 124, then at a block 126, the method 100 begins a counting period while maintaining normal fuel control. At a block 128, a determination is made regarding whether the counting period has exceeded a predetermined amount of time. If not, the method returns to the block 126 to continue the counting period and maintain normal fuel control. In a particular embodiment, the predetermined amount of time may correspond to a maximum amount of sump fuel volume to be used.

Once it is determined that the waiting period (e.g. XX seconds) has passed at the block 128, then the alternate fuel storage system (e.g. accumulator) is initiated at the block 130. In a particular embodiment, this may be accomplished by energizing an accumulator regulator. The accumulator or other alternate fuel storage system may then become the sole fuel source for the engine until completion of the maneuver.

Figure 2:
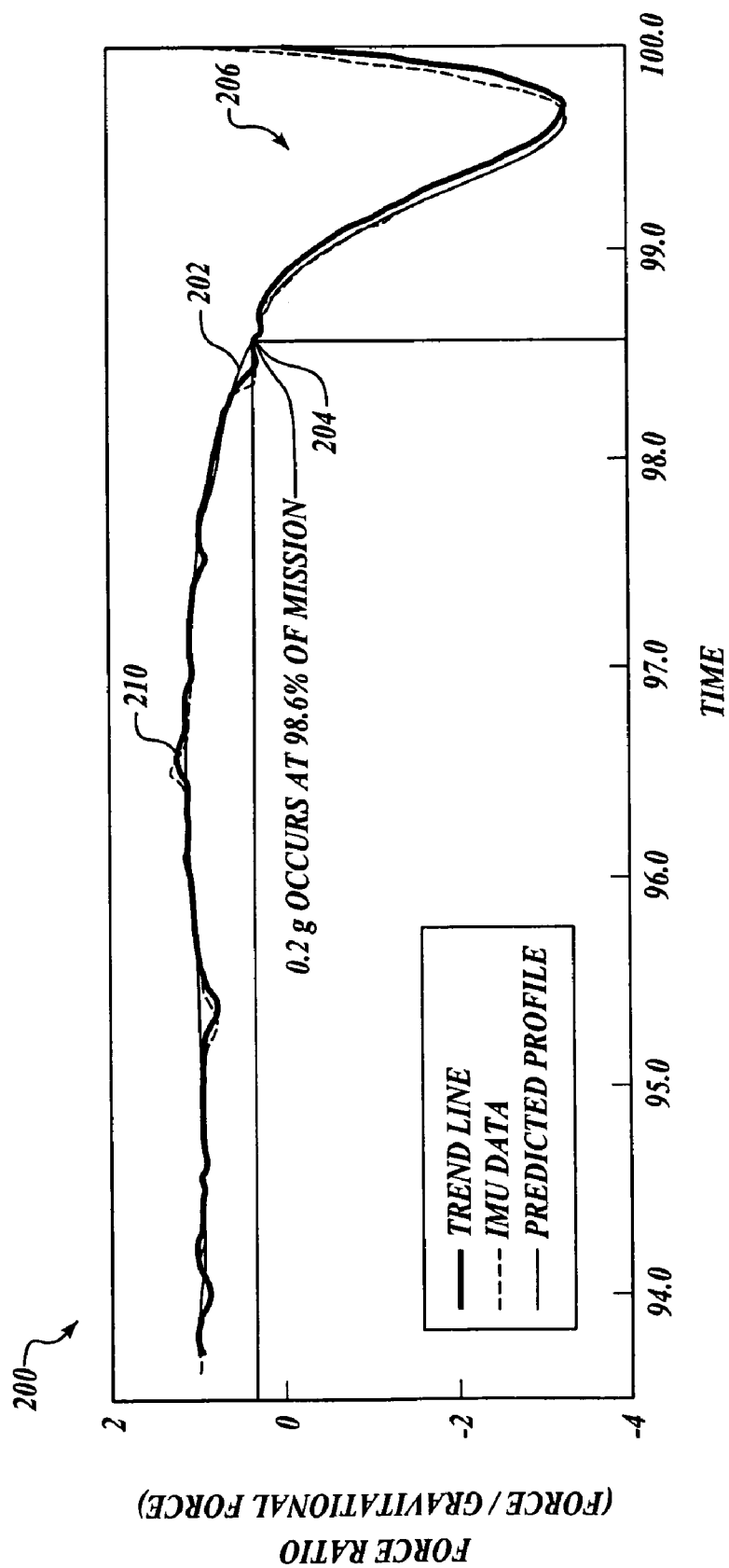
FIG. 2 is a graph of an acceleration versus time profile of an aircraft during a representative dive mission in accordance with an embodiment of the invention.

FIG. 2 is a graph 200 of an acceleration versus time profile of an aircraft during a representative dive mission in accordance with an embodiment of the invention. In this embodiment, the graph 200 shows both a predicted acceleration versus time profile 202 (shown in lighter line thickness) and actual IMU-measured acceleration versus time data 210 (shown in heavier line thickness). The IMU-measured acceleration versus time profile 210 includes a condition at which normal fuel fluid characteristics begin to become unpredictable 204 during an initial portion of a dive portion 206 of the dive mission. The acceleration versus time profile 210 (or the predicted profile 202) is representative of a typical time-based g profile used in the comparison with the IMU data in block 116 of the method 100 shown in FIG. 1. Of course, a wide variety of different dive mission profiles may be conceived, and the invention is not limited to the specific acceleration versus time profile 210 shown in FIG. 2.

Figure 3:
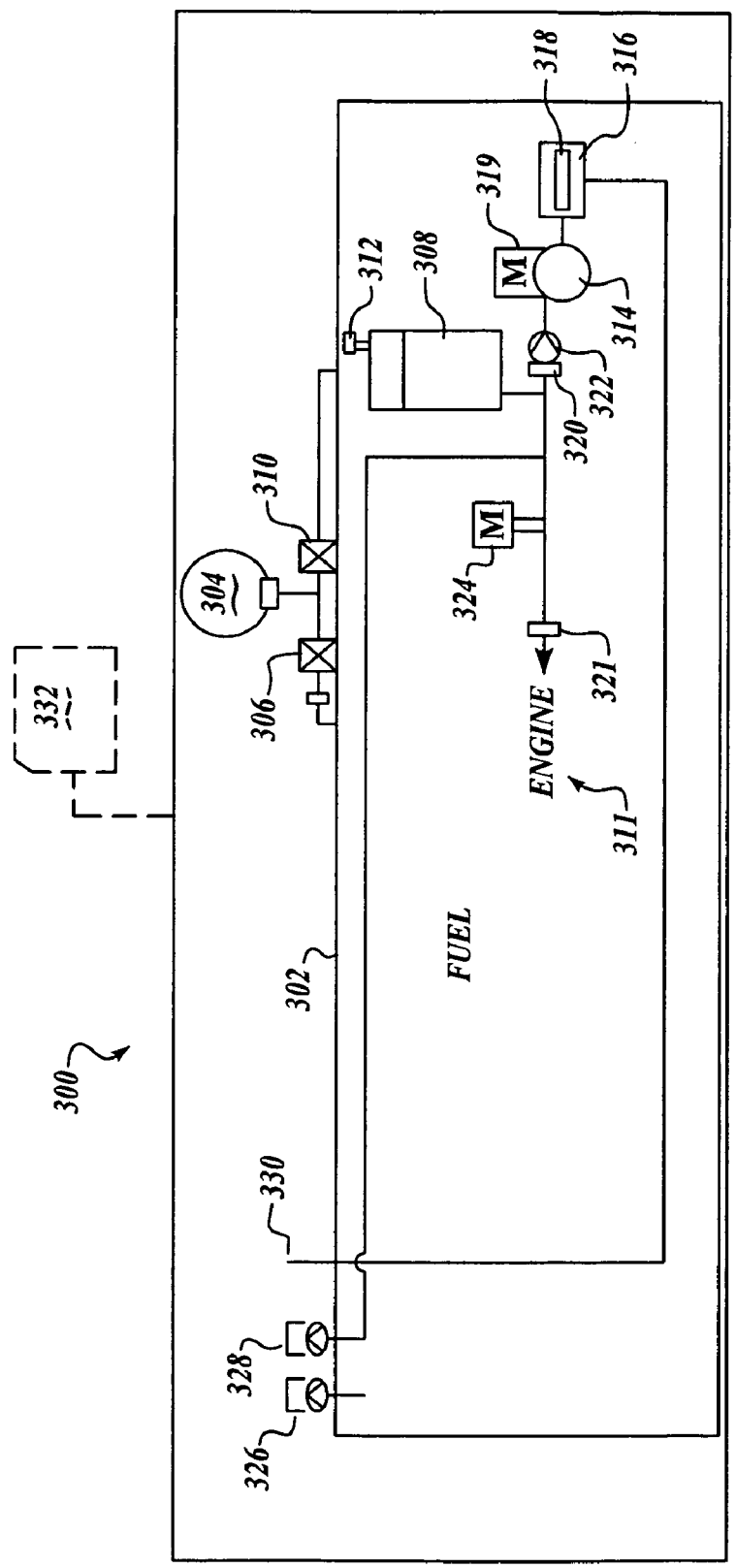
FIG. 3 is a schematic view of a fuel system in accordance with another embodiment of the invention.

FIG. 3 is a schematic view of a fuel system 300 in accordance with another embodiment of the invention. In this embodiment, the fuel system 300 includes a pressurized gas bottle 304 that provides pressurization to a fuel tank 302 via a first regulator 306. The gas bottle 304 also provides pressurization to an accumulator 308 via a second regulator 310. The accumulator 308 is adapted to provide pressurized fuel to an engine 311 as needed, including, for example, during engine start, or during a dive or other maneuver. The accumulator 308 has an orifice 312 to relieve the gas pressure over a long period of time, allowing the accumulator 308 to be refilled with fuel during the mission prior to a dive. This out-gassing may be used to supplement the pressurization of the fuel tank 302.

As further shown in FIG. 3, the fuel system 300 includes a fuel pump 314 and a sump 316 having a surface tension element 318. The fuel pump 314 is used during the normal fuel control portions of the mission, and pulls fuel from the sump 316. A first metering valve 319 may be coupled to the intake of the fuel pump 314. One or more isolation valves 320 and burst discs 321 are included to prevent fuel migration during storage, and are typically closed only during storage. A first check valve 322 downstream of the pump 314 is used to prevent accumulator fuel flow going through the pump 314 into the tank 302. A second metering valve 324 downstream of the fuel pump 314 regulates the fuel flow to the engine 311. The fuel system 300 further includes a fill valve 326 for the fuel tank 302, a fill/drain valve 328 coupled between the accumulator 308 and the second metering valve 324, and a drain 330 coupled to the sump 316. Finally, the fuel system 300 includes a control system 332 operatively coupled to one or more of the above-mentioned components (e.g. to the accumulator 308 and to at least one of the pump 314 and the sump 316), the control system 332 being adapted to receive input signals from one or more IMU's and to perform methods of controlling fuel flow in accordance with the present invention, including the method 100 described above and shown in FIG. 1. The fuel system 300 is one particular embodiment of fuel system that may utilize inertial measurement data to control fuel flow to the engine 311 in accordance with the present invention.

Figure 4:
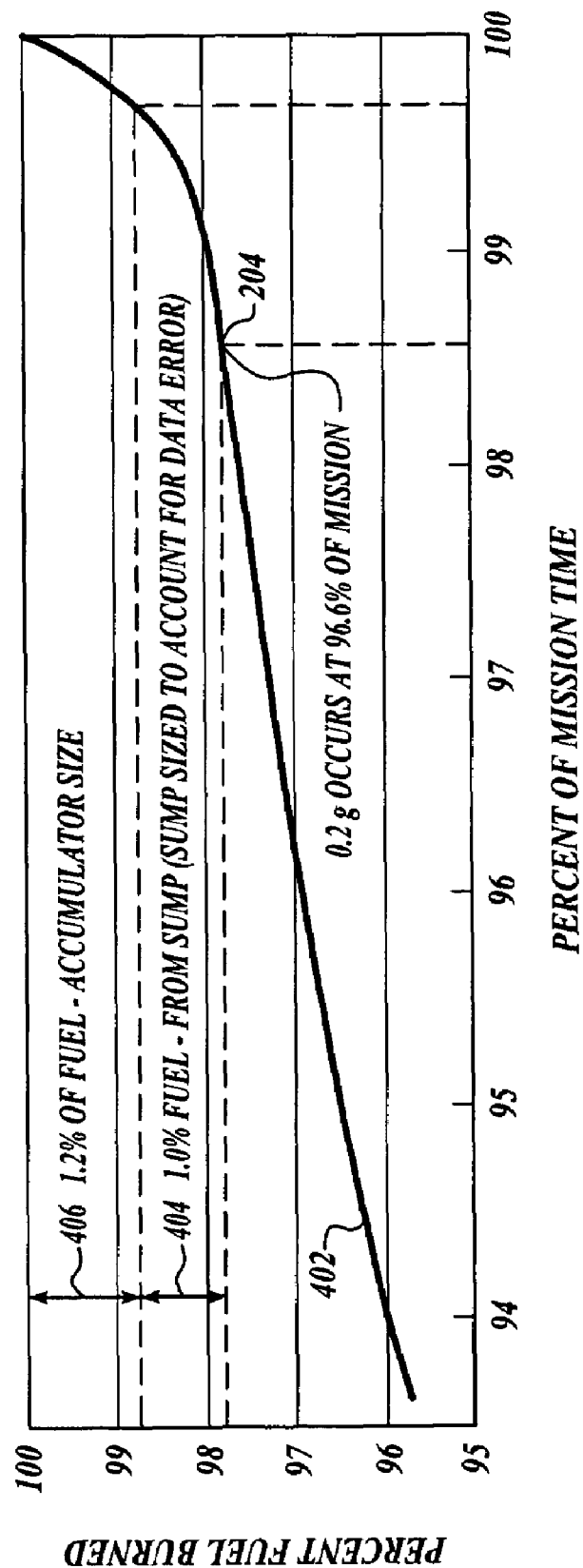
FIG. 4 is a graph of a representative percentage of fuel burned as a function of a mission time in accordance with yet another embodiment of the invention.

FIG. 4 is a graph 400 of a percentage of fuel burned as a function of a representative dive mission time 402 in accordance with yet another embodiment of the invention. As described above with respect to FIG. 2, the condition at which normal fuel fluid characteristics begin to become unpredictable 204 during the initial stages of the dive portion 206 of the dive mission is shown. This point 204 may then be used as a design point for sizing the sump 316 and the accumulator 308 of the fuel system 300 of FIG. 3. As shown in FIG. 4, once the maximum dive fuel usage and the corresponding time that the vehicle is in the dive portion 206 (i.e. from the point 204 to the end of the dive portion 206), the sump 316 can be sized to provide fuel for a predetermined amount of time. Once the sump fuel usage time is determined, the accumulator can be sized to complete the dive portion 206. For example, in the embodiment shown in FIG. 4, the sump 316 is sized to provide 1.0% of the percentage of fuel burned (designated as reference numeral 404), and the accumulator 308 is sized to provide 1.2% of the percentage of fuel burned (designated as reference numeral 406).

Embodiments of methods and apparatus in accordance with the present invention may provide improved determination of the point of handover from the sump to the accumulator (or other alternate fuel storage system). Embodiments of the present invention may advantageously allow prediction of the time the sump is used and the time required for the accumulator, thereby permitting a fuel system designer to optimize volumetric space by trading off sump and accumulator volume to achieve the optimum arrangement. Fuel usage may also be optimized since the size of the accumulator can provide a higher percentage of its fuel volume to the engine.

Figure 5:
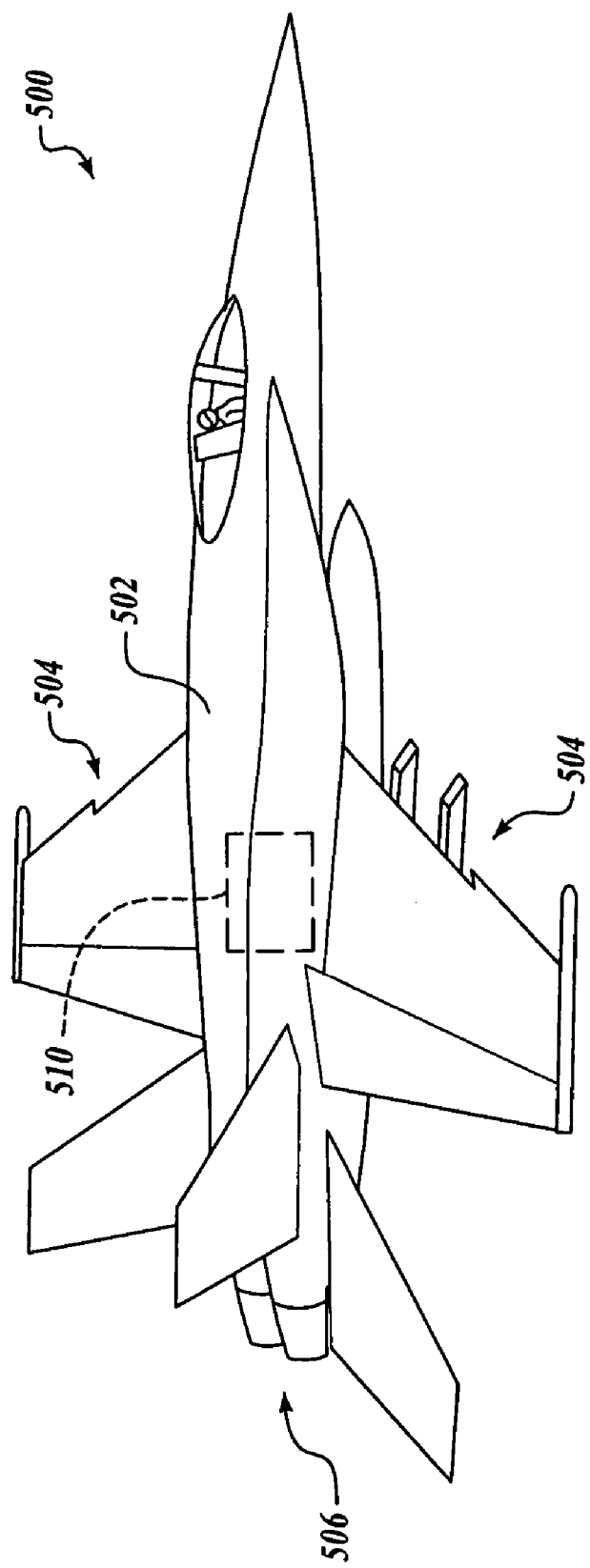
FIG. 5 is a side view of an aircraft in accordance with another alternate embodiment of the present invention.

It will be appreciated that embodiments of methods and apparatus in accordance with the present invention may be employed on a wide variety of aerospace vehicles. For example, FIG. 5 is a side view of an aircraft 500 in accordance with another alternate embodiment of the invention. In this embodiment, the aircraft 500 includes a fuselage 502, a pair of wings 504, and at least one engine 506. The aircraft 500 further includes a fuel system 510 that utilizes inertial measurement data in accordance with the present invention. In one particular embodiment, the fuel system 510 is of the type described above and shown in FIG. 3, and employs the method 100 of controlling fuel flow as described above and shown in FIG. 1. Of course, it will be appreciated that a variety of alternate embodiments of fuel systems and fuel control methods in accordance with the invention may be conceived.

Furthermore, although the aircraft 500 shown in FIG. 5 is representative of a well-known fighter aircraft, specifically, an F/A-18E Super Hornet manufactured by The Boeing Company, in alternate embodiments, virtually any other type or variety of military and commercial aircraft may be conceived that include apparatus and methods in accordance with the present invention. In alternate embodiments, for example, the aircraft may be a commercial passenger aircraft, including, for example, the 737, 747, 757, 767, and 777 models commercially-available from The Boeing Company. In still other embodiments, the aircraft may be a rotary aircraft, a bomber aircraft, a cargo aircraft, or any type of unmanned aircraft, including those described, for example, in The Illustrated Encyclopedia of Military Aircraft by Enzo Angelucci, published by Book Sales Publishers, September 2001.

While preferred and alternate embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for controlling a fuel flow to an engine of an aircraft, comprising:
    comparing an acceleration condition of the aircraft with a predetermined threshold at which normal fuel fluid characteristics begin to become unpredictable;
    comparing the acceleration condition with a time-based acceleration profile for a given flight profile;
    determining the aircraft is about to enter a prolonged negative acceleration regime;
    maintaining normal fuel control; and
    after a predetermined amount of time has passed, initiating an alternate fuel source to the engine.

2. The method of claim 1, further comprising determining an acceleration condition of the aircraft.

3. The method of claim 2, wherein said determining an acceleration condition of the aircraft includes determining the acceleration condition using an inertial measurement unit.

4. The method of claim 1, wherein said comparing the acceleration condition with a predetermined threshold at which normal fuel fluid characteristics begin to become unpredictable includes comparing the acceleration condition with a predetermined threshold of approximately 0.2 g.

5. The method of claim 1, wherein said comparing the acceleration condition with a time-based acceleration profile for a given flight profile includes comparing the acceleration condition with a time-based acceleration profile extracted from a pre-existing database of IMU acceleration data.

6. The method of claim 1, wherein step of after a predetermined amount of time has passed, initiating an alternate fuel source to the engine includes determining whether a counting period has exceeded an amount of time corresponding to a maximum amount of sump fuel volume to be used.

7. The method of claim 1, wherein said initiating an alternate fuel source to the engine includes initiating an accumulator to the engine.

8. The method of claim 1, wherein said initiating an alternate fuel source to the engine includes energizing an accumulator regulator.

9. The method of claim 1, wherein said maintaining normal fuel control includes maintaining said normal fuel control using a sump.

10. A method for controlling a fuel flow to an engine of an aircraft, comprising:
    controlling fuel flow in a normal manner;
    determining an acceleration condition of the aircraft;
    comparing the acceleration condition with a predetermined threshold at which normal fuel fluid characteristics begin to become unpredictable;
    comparing the acceleration condition with a time-based acceleration profile for a given flight profile;
    determining the aircraft is about to enter a prolonged negative acceleration regime;
    initiating a counting period while maintaining normal fuel control;
    determining whether the counting period has exceeded a predetermined amount of time; and
    when the predetermined amount of time has passed, initiating an alternate fuel source to the engine.

11. The method of claim 10, wherein said comparing the acceleration condition with a predetermined threshold at which normal fuel fluid characteristics begin to become unpredictable includes comparing the acceleration condition with a predetermined threshold of approximately 0.2 g.

12. The method of claim 10, wherein said comparing the acceleration condition with a time-based acceleration profile for a given flight profile includes comparing the acceleration condition with a time-based acceleration profile extracted from a pre-existing database of IMU acceleration data.

13. The method of claim 10, wherein said determining whether the counting period has exceeded a predetermined amount of time includes determining whether the counting period has exceeded an amount of time corresponding to a maximum amount of sump fuel volume to be used.

14. The method of claim 10, wherein said initiating an alternate fuel source to the engine includes initiating an accumulator to the engine.

15. The method of claim 10, wherein said initiating an alternate fuel source to the engine includes energizing an accumulator regulator.

16. A fuel system for delivering a fuel flow to an engine, comprising:
    a tank member having an interior region adapted to contain a quantity of fuel;
    a pump fluidly coupled to the interior region and adapted to provide a flow of fuel from the tank member through a feed conduit to the engine;
    a sump disposed within the interior region and adapted to provide a first quantity of fuel to the engine via the pump;
    a secondary fuel storage device operatively coupled to the feed conduit and adapted to provide a second quantity of fuel to the engine;
    a pressurized vessel operatively coupled to the tank member and to the secondary fuel storage device and adapted to pressurize each of the tank member and the secondary fuel storage device; and
    a control unit operatively coupled to the secondary fuel storage device and to at least one of the pump and the sump, the control unit being adapted to receive input signals from an acceleration measurement device indicative of an acceleration condition of the aircraft, and to output control signals to the secondary fuel storage device and to at least one of the pump and the sump, the control unit further being adapted to perform a method of controlling fuel flow, including:

comparing the acceleration condition of the aircraft with a predetermined threshold at which normal fuel fluid characteristics begin to become unpredictable;

comparing the acceleration condition with a time-based acceleration profile for a given flight profile;

determining the aircraft is about to enter a prolonged negative acceleration regime;

maintaining a first fuel flow to the engine from the sump using the pump; and after a predetermined amount of time has passed, initiating a secondary fuel flow from the secondary fuel storage device to the engine.

17. The fuel system of claim 16, wherein the acceleration condition of the aircraft is determined using an inertial measurement unit.

18. The fuel system of claim 16, wherein said comparing the acceleration condition with a predetermined threshold at which normal fuel fluid characteristics begin to become unpredictable includes comparing the acceleration condition with a predetermined threshold of approximately 0.2 g.

19. The fuel system of claim 16, wherein said comparing the acceleration condition with a time-based acceleration profile for a given flight profile includes comparing the acceleration condition with a time-based acceleration profile extracted from a pre-existing database of IMU acceleration data.

20. The fuel system of claim 16, wherein step of after a predetermined amount of time has passed, initiating the secondary fuel storage device to the engine includes determining whether a counting period has exceeded an amount of time corresponding to a maximum amount of sump fuel volume to be used.

21. The fuel system of claim 16, wherein said initiating the secondary fuel storage device to the engine includes initiating an accumulator to the engine.

22. The fuel system of claim 16, wherein said initiating the secondary fuel storage device to the engine includes energizing an accumulator regulator.

23. The fuel system of claim 16, wherein said maintaining normal fuel control includes maintaining said normal fuel control using a sump.

24. An aerospace vehicle, comprising:
a fuselage;
one or more lifting surfaces operatively coupled to the fuselage;
at least one engine operatively coupled to the fuselage; and
a fuel system operatively at least partially disposed within the fuselage and operatively coupled to the at least one engine, the fuel system including
a tank member having an interior region adapted to contain a quantity of fuel;
a pump fluidly coupled to the interior region and adapted to provide a flow of fuel from the tank member through a feed conduit to the engine;
a sump disposed within the interior region and adapted to provide a first quantity of fuel to the engine via the pump;
a secondary fuel storage device operatively coupled to the feed conduit and adapted to provide a second quantity of fuel to the engine;
a pressurized vessel operatively coupled to the tank member and to the secondary fuel storage device and adapted to pressurize each of the tank member and the secondary fuel storage device; and
a control unit operatively coupled to the secondary fuel storage device and to at least one of the pump and the sump, the control unit being adapted to receive input signals from an acceleration measurement device indicative of an acceleration condition of the aircraft, and to output control signals to the secondary fuel storage device and to at least one of the pump and the sump, the control unit further being adapted to perform a method of controlling fuel flow, including:
comparing the acceleration condition of the aircraft with a predetermined threshold at which normal fuel fluid characteristics begin to become unpredictable;
comparing the acceleration condition with a time-based acceleration profile for a given flight profile;
determining the aircraft is about to enter a prolonged negative acceleration regime;
maintaining a first fuel flow to the engine from the sump using the pump; and
after a predetermined amount of time has passed, initiating a secondary fuel flow from the secondary fuel storage device to the engine.

25. The aerospace vehicle of claim 24, wherein the acceleration condition of the aircraft is determined using an inertial measurement unit.

26. The aerospace vehicle of claim 24, wherein said comparing the acceleration condition with a predetermined threshold at which normal fuel fluid characteristics begin to become unpredictable includes comparing the acceleration condition with a predetermined threshold of approximately 0.2 g.

27. The aerospace vehicle of claim 24, wherein said comparing the acceleration condition with a time-based acceleration profile for a given flight profile includes comparing the acceleration condition with a time-based acceleration profile extracted from a pre-existing database of IMU acceleration data.

28. The aerospace vehicle of claim 24, wherein step of after a predetermined amount of time has passed, initiating the secondary fuel storage device to the engine includes determining whether a counting period has exceeded an amount of time corresponding to a maximum amount of sump fuel volume to be used.

29. The aerospace vehicle of claim 24, wherein said initiating the secondary fuel storage device to the engine includes initiating an accumulator to the engine.

30. The aerospace vehicle of claim 24, wherein said initiating the secondary fuel storage device to the engine includes energizing an accumulator regulator.

31. The aerospace vehicle of claim 24, wherein said maintaining normal fuel control includes maintaining said normal fuel control using a sump.

* * * * *